United States Patent
Rouillard et al.

(10) Patent No.: US 7,244,001 B2
(45) Date of Patent: Jul. 17, 2007

(54) MOTOR VEHICLE WHEEL ANTISKID AND ANTILOCK DEVICE USING THE BRAKING CIRCUIT

(75) Inventors: Jean-Marie Rouillard, La Croix Saint Ouen (FR); Philippe Lucienne, Aumont en Halatte (FR)

(73) Assignee: Poclain Hydraulics Industrie, Verberie (FR)

( * ) Notice: Subject to any disclaimer, the term of this patent is extended or adjusted under 35 U.S.C. 154(b) by 37 days.

(21) Appl. No.: 10/525,787

(22) PCT Filed: Sep. 2, 2003

(86) PCT No.: PCT/FR03/02624

§ 371 (c)(1),
(2), (4) Date: Feb. 28, 2005

(87) PCT Pub. No.: WO2004/020264

PCT Pub. Date: Mar. 11, 2004

(65) Prior Publication Data

US 2005/0242660 A1    Nov. 3, 2005

(30) Foreign Application Priority Data

Sep. 2, 2002  (FR) .................................. 02 10824

(51) Int. Cl.
*B60T 8/32* (2006.01)
(52) U.S. Cl. .................................... 303/113.2; 303/139
(58) Field of Classification Search ................ 303/139, 303/144, 116.1, 116.2; 180/197, 242, 244
See application file for complete search history.

(56) References Cited

U.S. PATENT DOCUMENTS 3,169,595 A    2/1965   Shepherd
5,188,436 A  * 2/1993   Devall ...................... 303/113.2
5,358,316 A  * 10/1994  Kervagoret et al. ..... 303/116.1
5,540,298 A  * 7/1996   Yoshioka et al. ........... 180/169
5,727,851 A    3/1998   Ohkubo et al.

FOREIGN PATENT DOCUMENTS

EP          0110119         6/1984

(Continued)

*Primary Examiner*—Christopher P. Schwartz
(74) *Attorney, Agent, or Firm*—Ladas & Parry LLP

(57) ABSTRACT

A braking system comprises one or more brake cylinders (100, 200, 300, 400) each associated with one or more wheels, a fluid supply (10), and a brake control (14) for commanding the feeding of fluid to the cylinder or cylinders via one or more brake valves and one or more brake pipes (44, 46). The system also comprises a function selector (50) adapted to adopt an antislip mode position (50A) or antilock mode positions in which it connects a branch pipe (52) to a fluid feed pipe (54) or to a return line (56) and a control valve (110, 210, 310, 410) for the or each brake cylinder adapted to adopt a normal braking position (100A, 210A, 310A, 410A) to connect the cylinder to the brake pipe (44, 46) and one or more special mode positions (110B, 210B, 310B, 410B) to connect the cylinder to the branch pipe (52) that the function selector connects to the return line or to the feed. The system further comprises means (120, 220, 320, 420, UC) for detecting wheelspin or a wheel tending to lock and for commanding the function selector (50) and the control valve associated with the brake cylinder associated with that wheel accordingly.

25 Claims, 6 Drawing Sheets

FOREIGN PATENT DOCUMENTS

Figure 1:
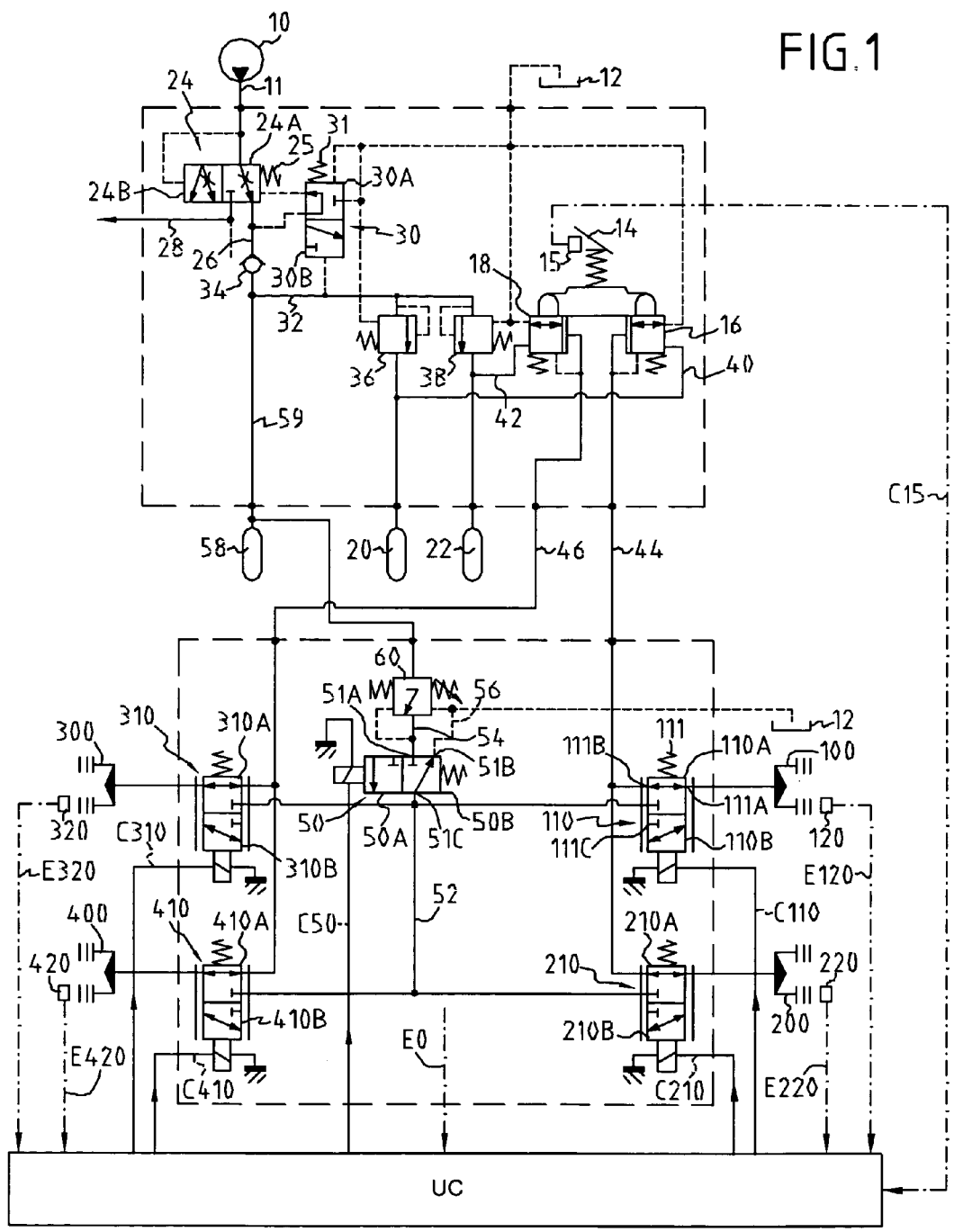

| | | |
|---|---|---|
| EP | 0479044 | 4/1992 |
| EP | 0505254 | 9/1992 |
| EP | 0526276 | 2/1993 |
| FR | 2109961 | 5/1972 |
| WO | WO89/01431 | 2/1989 |
| WO | WO92/03321 | 3/1992 |
| WO | WO92/07743 | 5/1992 |
| WO | WO97/14592 | 4/1997 |
| WO | WO97/21574 | 6/1997 |

* cited by examiner

MOTOR VEHICLE WHEEL ANTISKID AND ANTILOCK DEVICE USING THE BRAKING CIRCUIT

BACKGROUND OF THE INVENTION

1. Field of the Invention

The present invention relates to an antislip regulation and antilock braking system for vehicles equipped with a braking system comprising one or more brake cylinders each associated with one or more wheels, a source of fluid under pressure, and a brake control that is operated to effect braking by feeding said cylinders with fluid under pressure via one or more brake valves and one or more brake pipes.

2. Description of the Art

Braking systems including a brake master cylinder equipped with a reservoir are already known in the art and are used in particular in motor vehicles for use on roads. To effect braking, a volume of fluid that depends on the operating force applied to the brake pedal is transferred from the reservoir to the brake cylinder(s) via the master cylinder. When the brake pedal is released, the fluid returns to the reservoir. The reservoir is small and the above systems can be used only in applications in which transferring a very small volume of fluid is sufficient to operate a brake cylinder. Some motor vehicles are further provided with an antislip regulation and antilock braking system. In an antilock braking system, fast-acting solenoid valves reduce the fluid pressure in the brake cylinder as soon as a wheel associated with the cylinder tends to lock. In an antislip regulation system, if a wheel tends to slip, an auxiliary source of fluid under pressure assists braking of that wheel by feeding the associated brake cylinder.

For larger vehicles, and in particular for self-propelled agricultural and civil engineering plant, much greater volumes of fluid have to be transferred into the brake cylinders to effect braking. Consequently, the brake circuits generally comprise a pressure source which feeds fluid accumulators via a priority flow valve and a connector-disconnector. The fluid that feeds the brake cylinders comes from these accumulators, which are located far away from the cylinders.

WO 92/03321 proposes an antilock braking and antislip regulation system that uses a two-position control valve for each braked wheel that is adapted to connect the brake cylinder to a brake pipe connected to a brake fluid feed pipe or to a connecting pipe connected to a supplementary valve associated with the wheel.

If the wheel locks, the control valve connects the brake cylinder to the connecting pipe and the unoperated supplementary valve reduces the pressure in the brake cylinder. When the pressure has fallen sufficiently, the supplementary valve must be operated to connect the connecting pipe to an auxiliary pressure source to restore braking.

In the event of wheelspin, the control valve connects the brake cylinder to the connecting pipe connected to the supplementary valve, which is operated to connect the connecting pipe either to the auxiliary pressure source, to brake the wheel that is subject to wheelspin, or to the return line, to prevent excessive braking of the wheel.

The above system and its operation are relatively complex. Also, it is not the brake pipe that restores braking after a wheel has locked, which means that the level of braking cannot be controlled by the operator in the normal way.

SUMMARY OF THE INVENTION

The invention aims to remedy these drawbacks by proposing a vehicle antislip regulation and antilock braking system that can be integrated into a standard braking system in a simple manner, at low cost and without interfering with braking.

The above object is achieved by virtue of the fact that the system of the invention includes a function selector adapted to adopt an antislip mode position in which it connects a branch pipe to a fluid feed pipe and an antilock mode position in which it connects a branch pipe to a return line, a control valve for the brake cylinder or each brake cylinder adapted to adopt a normal braking position in which it connects the cylinder to the brake pipe and one or more special mode positions in which it connects the cylinder to a branch pipe connected either to the return line or to the fluid feed pipe, according to the position of the function selector, and means for detecting wheelspin or a wheel tending to lock and for commanding in consequence thereof at least the control valve associated with the brake cylinder associated with that wheel, in which system the control valve of the brake cylinder or of each brake cylinder is a progressive valve such that, when the function selector is in its antislip mode position, operation of the control valve modulates a braking force to control wheelspin and, when the function selector is in its antilock mode position, operation of the control valve modulates the releasing of the braking of a wheel.

One situation in which a wheel tends to lock arises when the speed of that wheel becomes zero or virtually zero during braking, even though the vehicle has not yet stopped. It may be detected by comparing the speed of this wheel with the average speed of the vehicle.

With the invention, a wheel is braked in the usual way when the control valve associated with the brake cylinder associated with that wheel is in its normal braking position. In this case, the cylinder may be fed with fluid via the brake pipe.

However, in its special mode position, in which it connects the cylinder to a branch pipe which is connected to a return line when the function selector is in its antilock mode position, the control valve associated with the brake cylinder associated with that wheel can be operated. Thus when the function selector is in its antilock mode position, if a tendency for the wheel to lock during braking is detected, it is sufficient to move the control valve associated with the brake cylinder associated with that wheel to its special mode position, in which it connects the cylinder to the branch pipe that is connected to the return line via the function selector. The fluid pressure therefore falls in the brake cylinder of the wheel concerned and locking thereof may be stopped or prevented.

Nonetheless, when the function selector is in its antislip mode position, it connects a fluid feed pipe to a branch pipe (either the above-mentioned pipe or another one). When the vehicle is moving, if wheelspin is detected, it is sufficient to operate the control valve associated with the brake cylinder associated with the wheel concerned to connect to the brake cylinder associated with that wheel the branch pipe that is connected to the fluid feed pipe via the function selector. That brake cylinder can therefore be fed with fluid to brake the wheel that is slipping.

Accordingly, to provide the antilock braking and antislip regulation functions, the invention may use a single function selector for the whole of the vehicle and a single control valve for the brake cylinder or each brake cylinder associated with one or more wheels. The function selector can be set to a standby position, or to an antislip mode position, in which wheelspin can be remedied simply by operating the control valve associated with the brake cylinder associated with the wheel concerned, or to an antilock mode position, in which locking of a wheel during braking can be prevented by operating the control valve associated with the brake cylinder associated with that wheel. The braking of a wheel tending to slip is modulated by operating the control valve associated with the brake cylinder of that wheel. Releasing and restoring the braking of a wheel that is tending to lock are also modulated by operating the control valve associated with the brake cylinder of that wheel, braking being restored by way of the brake pipe and as a function of how hard the operator is actuating the brake control. The function selector is not a progressive valve, being switched between its various positions in an on/off manner.

For example, the means for detecting a wheel that is slipping or tending to lock comprise a speed sensor for each wheel and a computer that compares the sensed speeds to a target speed, for example an average forward speed of the vehicle, as disclosed in EP-A-0 505 254, for example. The computer may be integrated into a control unit that operates the control valves, and where applicable the function selector, on the basis of data computed by the computer.

The function selector may be operated manually, automatically or semi-automatically, for example by the control unit referred to above.

One advantageous embodiment of the function selector comprises a feed channel connected to the fluid feed pipe, a return channel and an outlet channel connected to the branch pipe, the control valve for each brake cylinder comprises a channel connected to the cylinder, a channel connected to the brake pipe and a channel connected to the branch pipe, and, in the antilock mode position of the selector, the return channel and the outlet channel are connected together and the feed channel is isolated from them, in the antislip mode position of the selector, the feed channel and the outlet channel are connected together and the return channel is isolated from them, in the normal braking position of the control valve, the channel connected to the cylinder and the channel connected to the brake pipe are connected together and the channel connected to the branch pipe is isolated from them, and, in the special mode position of the control valve, the channel connected to the cylinder and the channel connected to the branch pipe are connected together and the channel connected to the brake pipe is isolated from them.

In a first variant of this embodiment, the same branch pipe is used in the antislip mode position of the function selector to feed a brake cylinder with fluid via its connection to the fluid feed pipe and in the antilock mode position to reduce the fluid pressure in a cylinder by connecting it to the return line.

In a second variant two branch pipes are used, one for the antislip mode position of the function selector and the other for the antilock mode position.

In this second variant the function selector comprises a feed channel connected to the fluid feed pipe, a return channel, a first outlet channel connected to a first branch pipe, and a second outlet channel connected to a second branch pipe, the control valve for each brake cylinder is adapted to adopt two special mode positions, respectively an antilock mode position and an antislip mode position, and comprises a channel connected to the cylinder, a channel connected to the brake pipe, a channel connected to the first branch pipe and a channel connected to the second branch pipe; in the antilock mode position of the selector, the return channel and the first outlet channel are connected together and the feed channel is isolated from them, in the antislip mode position of the selector, the feed channel and the second outlet channel are connected together and the return channel is isolated from them, and, in the normal braking position of the control valve, the channel connected to the cylinder and the channel connected to the brake pipe are connected to together and the channels connected to the first and second branch pipes are isolated from them and from each other; in the antilock mode position of the control valve, the channel connected to the cylinder and the channel connected to the first branch pipe are connected together and the channel connected to the brake pipe and the channel connected to the second branch pipe are isolated from them and, in the antislip mode position of said valve, the channel connected to the cylinder and the channel connected to the second branch pipe are connected together and the channel connected to the brake pipe and the channel connected to the first branch pipe are isolated from them and from each other.

The antilock mode position of the function selector is advantageously an unoperated position towards which said selector is urged at all times, whereas the selector must be operated to go from this position to its antislip mode position.

The antilock mode position of the function selector is a failsafe position that improves braking by preventing locking of the wheels. It is therefore beneficial for this position to be the default position of the function selector.

The normal braking position of the control valve for each brake cylinder is advantageously an unoperated position of that valve towards which it is urged at all times, whereas it must be operated to move it from that position to its special mode position(s).

The system advantageously includes one or more brake fluid accumulators adapted to be supplied by the source of fluid under pressure and one or more brake valves adapted to be operated to connect the brake pipe to said accumulator.

The accumulator may be supplied with fluid from a source of fluid under pressure. It constitutes a reserve of fluid under pressure available to effect braking at any time by operating the brake valve by means of an actuator such as a brake pedal, in the manner known in the art.

The system advantageously includes an antislip fluid accumulator adapted to be supplied by the source of fluid under pressure and to be connected to said fluid feed pipe of the function selector.

This antislip fluid accumulator also constitutes a safety reserve of fluid under pressure. It is preferably separate from that which is used for braking by virtue of its connection to the brake pipe by the brake valve.

The fluid pressure in the fluid feed pipe of the function selector is advantageously lower than the pressure at which fluid is fed to the brake pipe, which can be achieved by connecting the antislip fluid accumulator to the fluid feed pipe via a pressure reducer.

In fact, the fluid feed pipe to which the feed channel of the function selector is connected may be a pipe connected to the antislip fluid accumulator and thus provide a standby fluid pressure available to the feed channel of the function selector to implement the antislip function. Because of the pressure reducer, this standby fluid pressure may be a controlled and constant pressure even if the fluid pressure in the antislip accumulator has fallen following action to prevent wheelspin. The fluid feed pipe could be connected to the discharge side of a pump without passing through an accumulator. A pressure reducer is also advantageous in this situation in that it makes a stabilized standby fluid pressure available to the feed channel of the function selector.

The invention also relates to an antislip regulation and antilock braking control valve for one or more wheels of a vehicle that is of simple construction and operation whilst allowing modulated antislip regulation and antilock braking action.

To this end, the valve of the invention has a first channel connected to a brake cylinder, a second channel connected to a braking pressure source, a third channel connected to a pressure relief pipe, and a fourth channel connected to an antislip pressure source, said control valve is a progressive valve that includes a member mobile between a normal braking position in which the first and second channels are connected together and isolated from the third and fourth channels, an antilock mode position in which the first and third channels are connected together and isolated from the second and fourth channels, and an antislip mode position in which the first and fourth channels are connected together and isolated from the second and third channels, and includes means for varying the communication cross-section between the first and fourth channels in the antislip mode position as a function of the pressure in the first channel and for varying the communication cross-section between the first and third channels in the antilock mode position as a function of the pressure in the first channel.

The control valve preferably serves as an antislip pressure reducer and an antilock pressure limiter and therefore preferably comprises means for establishing communication between the first and third channels when communication between the first and fourth channels is shut off from the antislip mode position and for establishing communication between the first and second channels when communication between the first and third channels is shut off from the antilock mode position.

The invention will be clearly understood and its advantages will become apparent after reading the following detailed description of one embodiment of the invention, which is given by way of non-limiting example.

BRIEF DESCRIPTION OF THE DRAWING FIGURES

Figure 2:
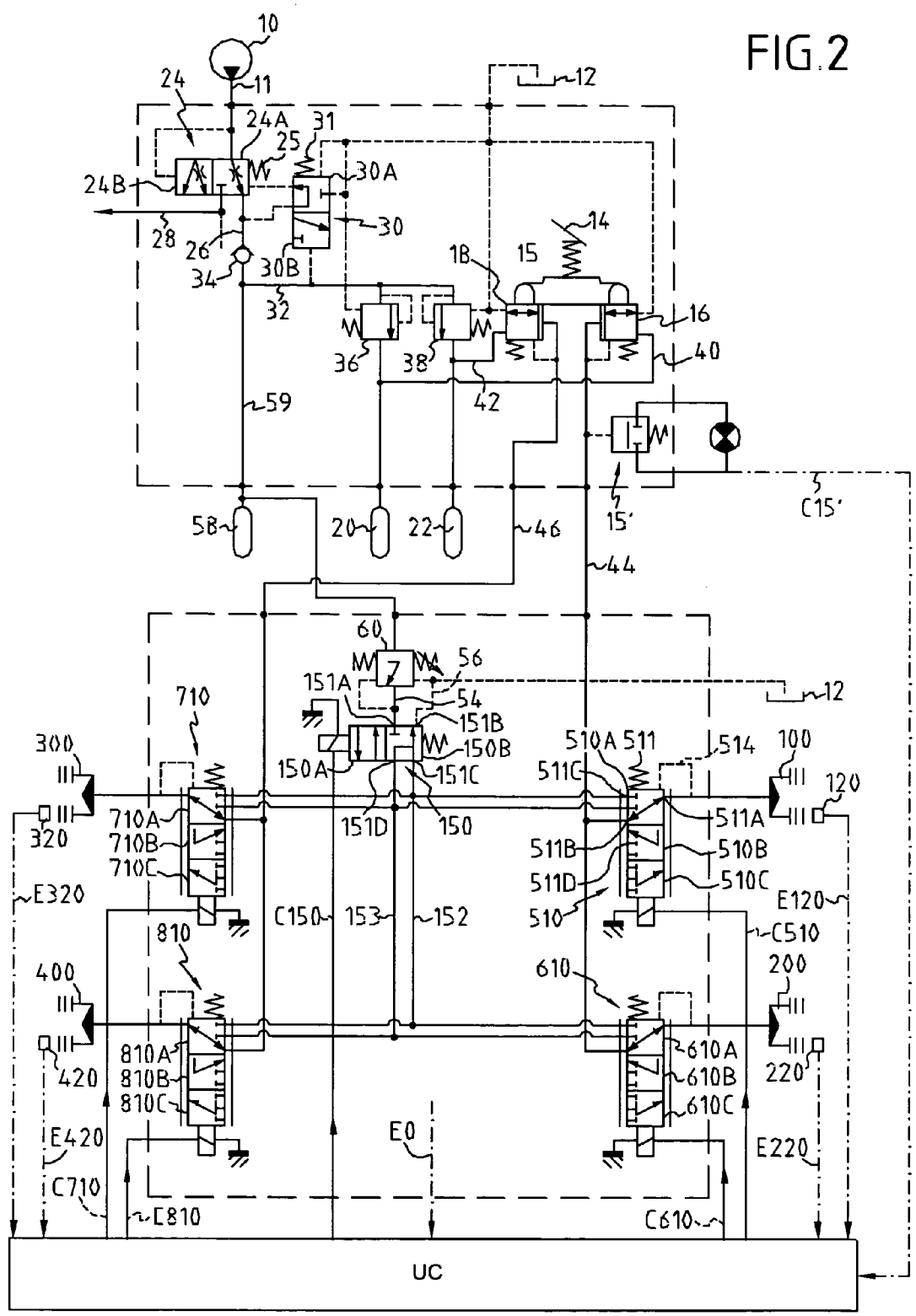
Figure 3:
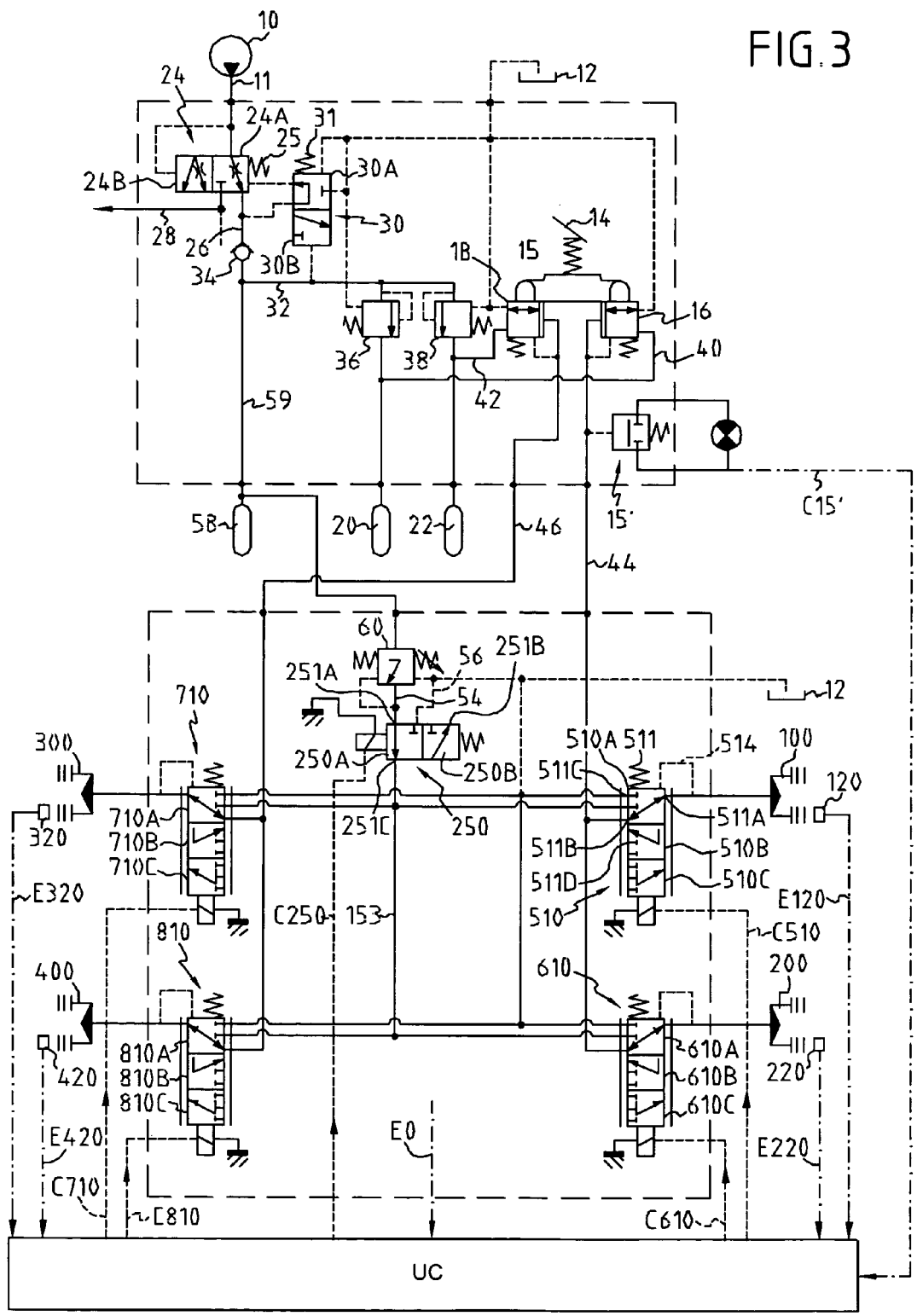
Figure 4:
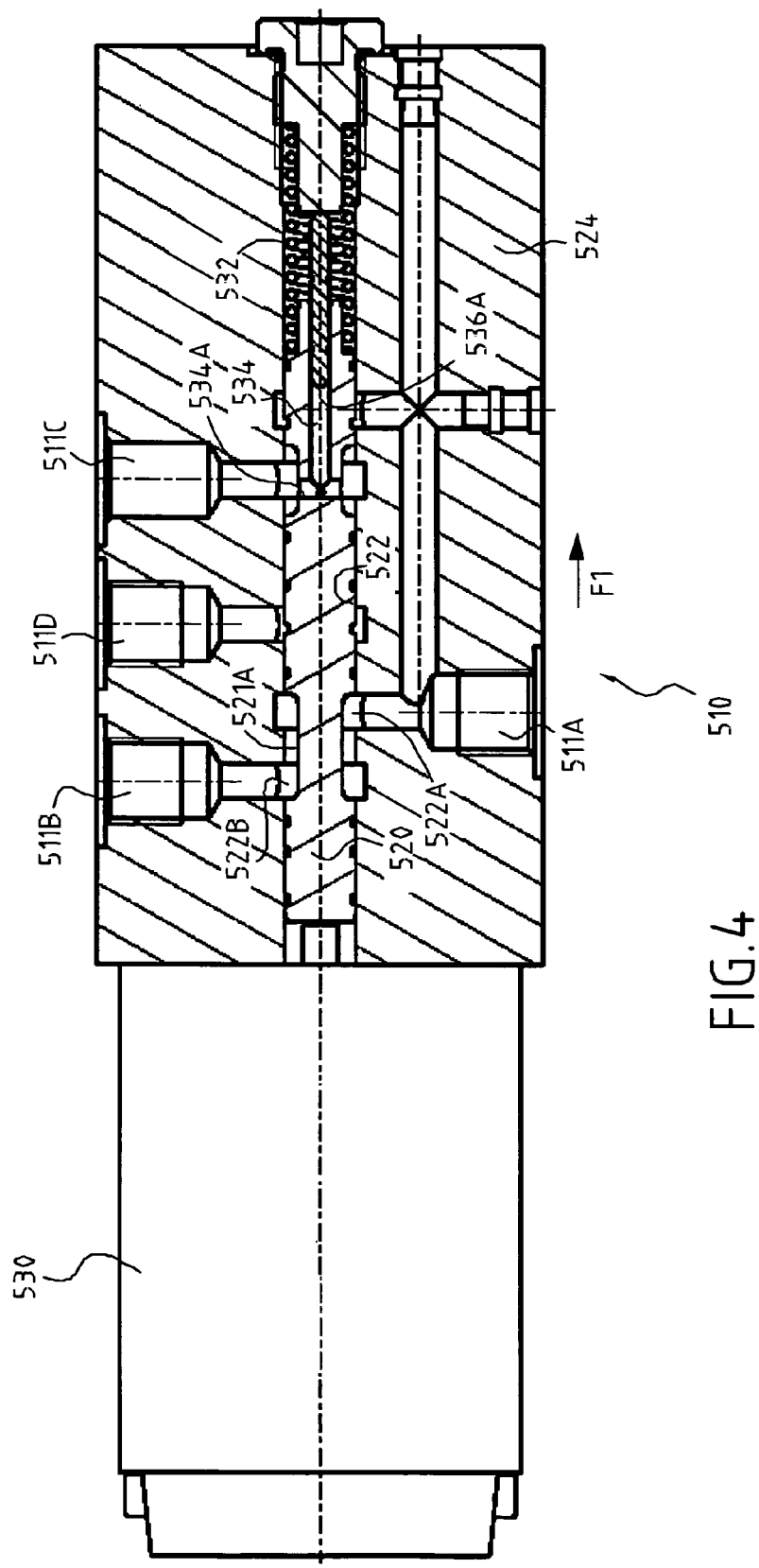
Figure 5:
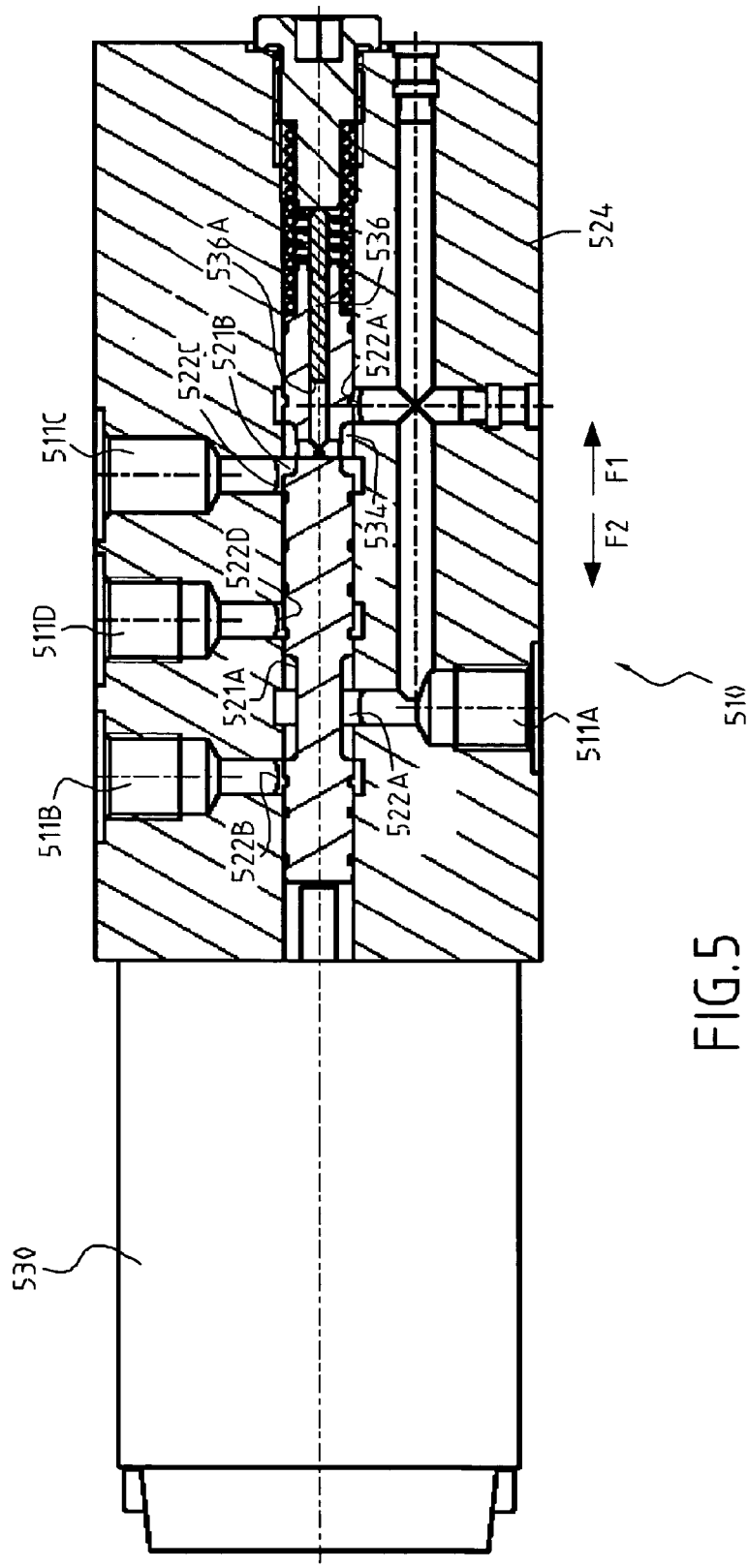
Figure 6:
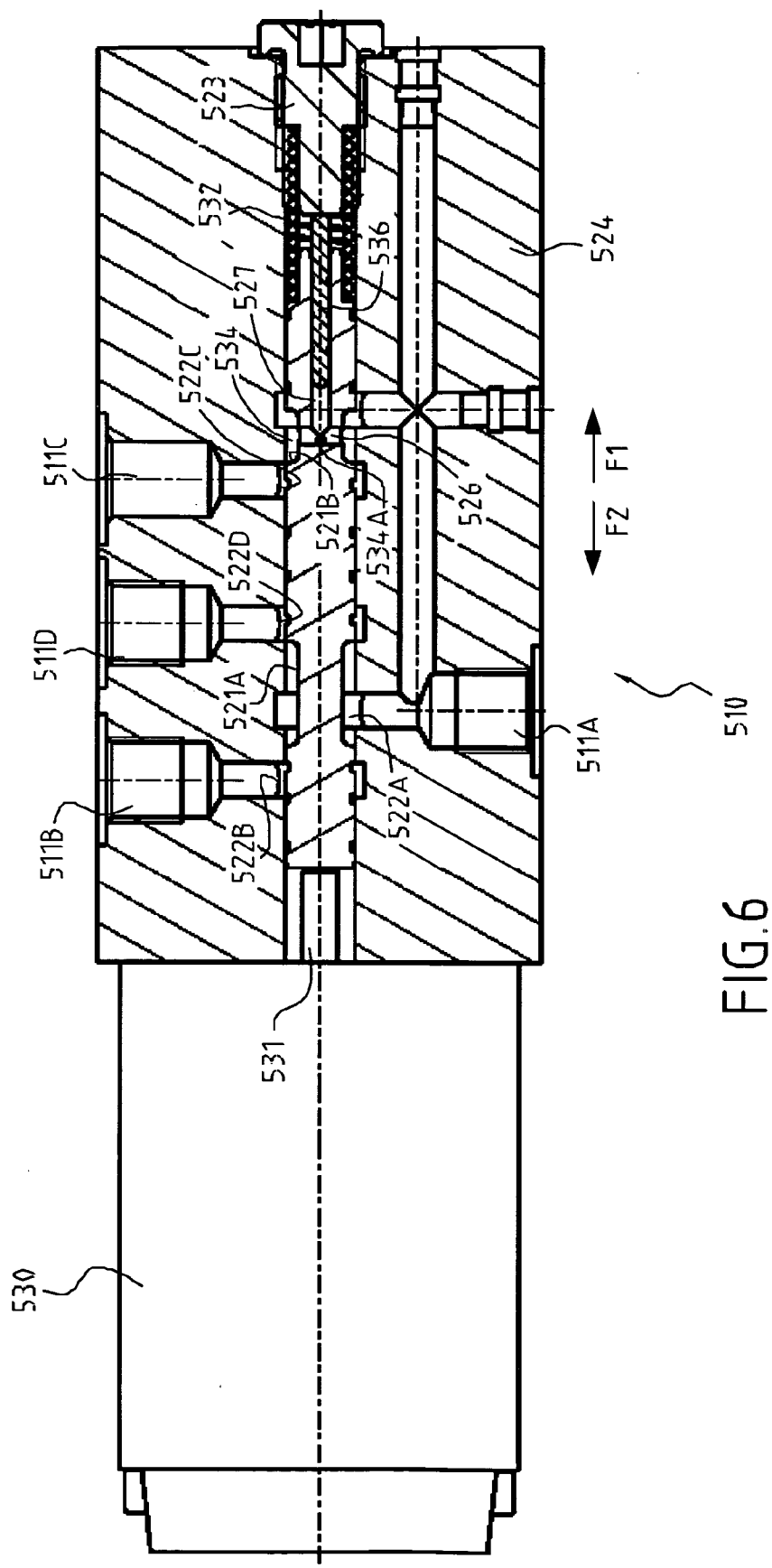

The description refers to the appended drawings, in which:

FIGS. 1 to 3 show a brake circuit incorporating three variants of a system of the invention; and FIGS. 4 to 6 show three positions of a control valve of the invention.

DETAILED DESCRIPTION OF THE PREFERRED EMBODIMENTS

The brake circuit represented in FIGS. 1 to 3 is used to brake a vehicle having four wheels each equipped with a respective brake cylinder 100, 200, 300 and 400.

The brake circuit is an open circuit comprising a pump 10 discharging fluid under pressure and a reservoir 12 at atmospheric pressure. In the example shown, the brake circuit is split into two subcircuits (for example one subcircuit per axle), one for braking the wheels associated with the cylinders 100 and 200 and the other for braking the wheels associated with the cylinders 300 and 400. The brake control is a brake pedal 14 which operates a brake valve 16 to brake the wheels associated with the cylinders 100 and 200 and a brake valve 18 to brake the wheels associated with the cylinders 300 and 400. Of course, the invention applies equally to a circuit comprising a single brake valve for all the brake cylinders or a circuit comprising more than two subcircuits. Here, the brake valves 16, 18 are pressure reducers of variable calibration that generate a pressure proportional to the force applied to the brake pedal 14.

In a manner that is known in the art, the pump 10 can feed fluid to respective brake fluid accumulators 20 and 22 connected to the brake valves 16 and 18.

For example, the pump 10 is an auxiliary pump that is used to control the steering system and/or accessories or tools of the vehicle. A priority flow valve 24 is fitted to the discharge pipe 11 of the pump 10. In its unoperated position, shown in the figures, this valve connects the discharge pipe 11 to a pipe 26 for feeding fluid to the accumulators.

In its first position 24A, the valve 24 connects the discharge pipe 11 only to the pipe 26, in order to charge the accumulators with fluid. In its second position 24B, the valve 24 also connects the discharge pipe 11 to the pipe 26, via a channel incorporating a constriction, but additionally connects this discharge pipe to an auxiliary pipe 28 via a "priority" channel with no constriction.

The pipe 28 provides "priority" auxiliary functions of the vehicle, as mentioned above, in particular the steering function.

The brake circuit also includes a valve 30 referred to herein as a connector-disconnector.

In its first position 30A, shown in the figures, the connector-disconnector 30 moves the valve 24 to its first position 24A by feeding the fluid pressure present in the pipe 26 to a first control chamber of this valve, to add the effect of that pressure to the force exerted by a return spring 25 that urges the valve 24 towards its first position 24A at all times. The position 30A is the connection position of the connector-disconnector.

In its second or disconnection position 30B, the connector-disconnector 30 establishes communication between the control chamber referred to above and the reservoir 12 at atmospheric pressure. The valve 24 can therefore occupy its position 24B and be urged towards the second position by feeding fluid from the discharge pipe 11 to a second control chamber acting in the opposite direction to the spring 25 and the first control chamber.

The default position of the connector-disconnector 30 is its connection position 30A, towards which it is urged by a spring 31 at all times, with the result that the default position of the valve 24 is its first position 24A, in which it charges the accumulators with fluid, in particular on starting. When the pressure in the accumulator reaches a first threshold, the connector-disconnector 30 is switched to its second position 30B by feeding a control chamber acting in the opposite direction to the spring 31 with fluid from an accumulator feed pipe 32 which is connected to the pipe 26 via a check valve 34 allowing fluid to flow only from the pump 10 to the accumulators.

Each of the accumulators 20 and 22 is connected to the pipe 32 via a respective isolating valve 36 and 38 to constitute a safety system for isolating a faulty subcircuit. The brake valves 16 and 18 are connected to the accumulators 20 and 22 on the downstream side of the pressure limiters by respective pipes 40 and 42. When the brake pedal 14 is depressed, it operates the valves 16 and 18 to feed brake fluid to the respective brake pipes 44 and 46, the valves 16 and 18 connecting the brake pipes 44 and 46 to the respective pipes 40 and 42.

If the pressure in the accumulators falls to a second threshold, the force of the spring 31 becomes dominant and returns the connector-disconnector to its position 30A to recharge the accumulators.

The FIG. 1 variant of the system of the invention comprises a function selector 50 having two or more positions. A position 50A is an antislip mode position in which it connects a branch pipe 52 to a fluid feed pipe 54. A second position 50B of the function selector is an antilock mode position in which it connects the branch pipe 52 to a return line 56 connected to the reservoir 12. The function selector in fact comprises a feed channel 51A connected to the pipe 54, a feed channel 51B connected to the reservoir 12 at atmospheric pressure, and an outlet channel 51C connected to the branch pipe 52.

The fluid feed pipe 54 is connected to the same pressure source as the brake circuit. In fact, the pipe 54 is connected to the above-mentioned pipe 32 by a connecting pipe 59 which is in turn connected to an antislip fluid accumulator 58 that is supplied by the pump 10. The accumulator 58 is therefore charged with fluid in the same manner as the above-mentioned accumulators 20 and 22, as a function of the position of the connector-disconnector 30 and the position of the priority flow valve 24.

The fluid pressure in the pipe 54 is advantageously lower than the fluid feed pressure in the brake pipe(s) 44 and 46. In fact, the standby fluid pressure in the feed 54 lightly brakes a wheel that is tending to slip, via the feed channel 51A of the selector 50. The brake torque to be developed for this is not necessarily as high as that for stopping the vehicle.

For a stabilized standby fluid pressure to be achieved in the feed channel 51A, the antislip fluid accumulator 58 is connected to the fluid feed pipe 54 via a pressure reducer 60, which may be calibrated as a function of the characteristics of the vehicle, taking account of parameters such as the mass of the vehicle and the power of its engine(s). For example, the pressure of the fluid stored in the accumulators 20 and 22 and present in the brake pipes 44 and 46 to effect braking may be from 120 bar to 140 bar. This is also the pressure of the fluid stored in the accumulator 58. Depending on the vehicle type, the pressure reducer 60 may be adjusted so that the standby pressure in the fluid feed pipe 54 is stabilized to a value from 50 bar to 100 bar.

Each brake cylinder is associated with a respective control valve 110, 210, 310 and 410. For the cylinders 100, 200, 300 and 400, each of these valves may occupy a respective normal braking position 110A, 210A, 310A and 410A in which it connects the associated brake cylinder to a brake pipe, respectively a brake pipe 44 for the valves 110 and 210 and a brake pipe 46 for the valves 310 and 410.

Each control valve can also occupy a respective special node position 110B, 210B, 310B and 410B in which it connects the associated cylinder to the branch pipe 52.

In the FIG. 1 example, like the valve 110, each control valve comprises a channel 111A connected to the associated cylinder, a channel 111B connected to the brake pipe (respectively the brake pipe 44 for the valves 110 and 210 or the brake pipe 46 for the valves 310 and 410), and a channel 111C connected to the branch pipe 52.

In the normal braking position 110A of the valve 110, the channels 111A and 111B are connected together and the channel 111C is isolated from them. In the special mode position 110B, the channels 111A and 111C are connected together and the channel 111B is isolated.

When the selector 50 is in its antilock mode position 50B, its return channel 51B and the outlet channel 51C are connected together and the feed channel 51A is isolated from them. Thus, if one of the wheels, for example that associated with the cylinder 100, is detected as tending to lock on braking (the control valves 110, 210, 310 and 410 being in their normal braking position), it suffices to place the valve 110 associated with that cylinder in its special mode position 110B. The channel connecting this valve to the cylinder 111A is then automatically connected to the return line 56 via its connection to the channel 111C that is in turn connected to the branch pipe 52. The pressure in the brake cylinder falls and locking of the wheel ceases.

In the antislip mode position 50A of the selector 50, its feed channel 51A and the outlet channel 51C are connected together and the return channel 51B is isolated from them. Thus if the vehicle is moving without braking, and skidding of one of the wheels is detected, for example the wheel associated with the cylinder 100, it suffices to place the valve 110 associated with that cylinder in its special mode position 110B. Because the channels 51A and 51C are connected, the effect of this is to connect the cylinder 100 to the branch pipe 52, which is in turn connected to the fluid feed pipe 54. The standby pressure in the pipe 54 can therefore be fed to the cylinder 100 to brake the wheel that is slipping.

The FIG. 2 variant differs from the FIG. 1 variant in terms of the conformations of the function selector 150 and the control valves 510, 610, 710 and 810. Parts in FIG. 2 that are unchanged relative to those in FIG. 1 are designated by the same reference numbers.

The function selector 150 comprises a feed channel 151A connected to the fluid feed pipe 54, a return channel 151B connected to the return line 56, a first outlet channel 151C connected to a first branch pipe 152, and a second outlet channel 151D connected to a second branch pipe 153.

For each brake cylinder 100, 200, 300 and 400, the respective control valve 510, 610, 710 and 810 is able to assume a respective braking position 510A, 610A, 710A and 810A, a respective special mode position 510B, 610B, 710B and 810B that constitutes an antilock mode position, and a respective special mode position 510C, 610C, 710C and 810C that constitutes an antislip mode position.

The control valves 510, 610, 710 and 810 are identical, and the valve 510 is described in more detail by way of example.

It comprises a channel 511A connected to the cylinder, a channel 511B connected to the brake pipe, a channel 511C connected to the first branch pipe, and a channel 511D connected to the second branch pipe.

In the normal braking position 510A of the valve 510, its channel 511A connected to the cylinder and its channel 511B connected to the brake pipe are connected together and the channels 511C and 511D connected to the first and second branch pipes are isolated from them.

In its antilock mode position 510B, its channel 511A connected to the cylinder and its channel 511C connected to the first branch pipe are connected together and its channel 511B connected to the brake pipe and its channel 511D connected to the second branch pipe are isolated from them and from each other.

Finally, in the antislip mode position 510C of the valve, its channel 511A connected to the cylinder and its channel 511D connected to the second branch pipe are connected together and its channel 511B connected to the brake pipe and its channel 511C connected to the first branch pipe are isolated from them and from each other.

The selector 150 can occupy an antislip mode position 150A and an antilock mode position 150B. In the antislip mode position, the feed channel 151A and the second outlet channel 151D are connected together and the return channel 151B is isolated from them and the first outlet channel 151C is connected to the return channel 151B. In the antilock mode position 150B of the selector, the return channel 151B and the first output channel 151C are connected together and the feed channel 151A is isolated from them and the second outlet channel 151B is connected to the return channel 151B.

When the selector 150 is in its antilock mode position 150B and a tendency of one of the wheels to lock on braking is detected, for example the wheel associated with the cylinder 100, it suffices to switch the control valve 510 from its normal braking position 510A to its antilock mode position 510B in order to reduce the pressure in the brake cylinder and thereby stop the tendency of this wheel to lock. In this case, switching the valve 510 to its position 510B establishes communication between the cylinder 100 and the return line 56.

In a driving situation in which wheelspin may arise, the selector 150 is placed in its antislip mode position 150A. If a wheel slips, for example the wheel associated with the cylinder 100, it suffices to place the control valve 510 in its antislip mode position 510C to feed the standby fluid pressure in the fluid feed pipe 54 to the cylinder 100, because of the connection between the channel 511A connected to the cylinder and the channel 511D connected to the second branch pipe 153 which, in the position 150A of the selector 150, is connected to the fluid feed pipe 54. The pressure in the cylinder 100 therefore increases to brake the wheel that was slipping.

Each of the control valves 510, 610, 710 and 810 varies the fluid pressure in the associated cylinder and includes double-acting pressure reducer means. To control wheelspin, the control valve feeds the cylinder proportionately with fluid via the channel 511A, acting as a pressure reducer since it feeds the cylinder with fluid at a reduced pressure. This applies an appropriate brake pressure to the wheel that was slipping.

When controlling a tendency to locking, the control valve is adapted to relieve proportionately the pressure in the cylinder, thereby acting as a cylinder pressure limiter.

As mentioned in relation to the valve 510, the operation of this control valve takes account of the pressure in the cylinder, to which it is connected via a pipe 514.

In the example shown, the antilock mode position 510B and the antislip mode position 510C are adjacent. To be more precise, the control valve passes through its antilock mode position on moving between its normal braking position and its antislip mode position.

The progressive action of each control valve means that the communication sections between the channels of the valve and the pipes that are connected to them vary progressively as the valve is moved between these two positions.

As already explained, when the selector 150 is in its antislip mode position 150A the channels 151A and 151D are connected together, as a result of which standby pressure is present in the second branch pipe 153, whereas the channels 151C and 151B are connected together, as a result of which the first branch pipe 152 is connected to the return line 56.

Thus the pressure in the cylinder 100 referred to above may be regulated when the selector 150 is in its antislip mode position.

The progressive action of the valve 510 means that, when it is moving, the communication area between its channels 511A and 511C may be varied to adjust the pressure relief applied to the cylinder, since the channel 511C is connected to the return line 56 via the branch pipe 152, and the communication area between the channels 511A and 511D may be varied to adjust the pressure rise in the brake cylinder until the pressure in the cylinder (which is sensed via the pipe 514) corresponds to the control set point, since this channel 511D is connected to the feed pipe 54 via the branch pipe 153.

FIG. 3 shows a variant of the FIG. 2 circuit in which parts unchanged compared to FIG. 2 are designated by the same reference numbers.

The two-position function selector 250 of the FIG. 3 circuit has a feed channel 251A connected to the feed pipe 54, a return channel 251B connected to the reservoir 12, and an outlet channel 251C connected to the branch pipe 153.

The control valves 510, 610, 710 and 810 are the same as those of the FIG. 2 circuit. However, one channel of each of these valves, such as the channel 511C of the valve 510, is connected at all times to the reservoir 12 at atmospheric pressure.

FIG. 3 shows the function selector in its antislip mode position 250A, in which its channels 251A and 251C communicate to connect the branch pipe 153 so that it receives the standby pressure in the pipe 54.

Accordingly, when slipping of a wheel is detected, the control valve associated the brake cylinder of that wheel, for example the valve 510, is moved to its antislip mode position 510C in order to feed the brake cylinder at the pressure in its channel 511D that communicates with the pipe 153.

In its antilock mode position 250B, the function selector 250 connects the pipe 153 to the reservoir at atmospheric pressure via its channels 251B and 251C, which communicate with each other, with the result that the standby antislip pressure is no longer available in the channel 511D, since the pipe 153 no longer communicates with the pipe 54.

In this situation, locking of the wheel whose brake cylinder is associated with the valve 510 may be prevented by switching that valve to its position 510B, in which its channels 511A and 511C communicate with each other, the channel 511C being connected to the reservoir 12 at all times.

Because this connection of the channel 511C to the reservoir 12 is permanent, when the function selector is in its antislip mode position the valve 510 can oscillate between its positions 510B and 510C to prevent skidding without risk of locking, as described above with reference to FIG. 2.

In the FIGS. 1 and 2 variants, the normal braking position of the control valve for each brake cylinder is an unoperated position of the valve towards which it is urged at all times, whereas it must be operated to move it from this position to its special mode position(s). For example, the valve 110 in FIG. 1 and the valve 510 in FIG. 2 are urged towards their respective normal braking positions at all times by respective return springs 111 and 511.

As for the selector 50, the default position of the selector 150 is its antilock mode position 150B, and it must be operated to move it from this position to its antislip mode position 150A.

In FIGS. 1 and 2, the function selectors and the control valves are solenoid valves controlled by an electronic control unit UC which receives various operating parameters of the vehicle as input and controls the function selector and the control valves accordingly.

The system of the invention comprises means for sensing the speed of each wheel of the vehicle that is associated with a brake cylinder, means for determining a target speed for each of those wheels, and means for comparing the sensed speed to the target speed and deducing from the result of this comparison the occurrence either of wheelspin or of a tendency of a wheel to lock. A respective speed sensor 120, 220, 320 and 420 of a type known in the art may be associated with each wheel to sense its rotation speed. Without this being limiting on the invention, the sensor may be an inductive, capacitive or magnetoresistive sensor or, if each wheel is driven by a hydraulic motor, a motor fluid flowrate sensor. These sensors are connected to the control unit UC by respective input lines E120, E220, E320 and E420.

The control unit is adapted to determine a target speed for each of the wheels. With regard to determining the target speed, see the document EP-A-0 5-5 254. For example, the target speed may be determined as an average speed computed from the rotation speeds of the various wheels, excluding rotation speeds that are unlikely (because of a wheel locking or slipping). The computed target speed may additionally be corrected to take account of the steering angle of the steerable wheels, for example, and of other parameters responsible for the wheels having different angular speeds, such as a difference in wheel diameter. The target speed may be computed from the speed of the vehicle as measured by radar.

The target speed may also be computed as a function of the speed required by the operator, according to how far the accelerator of the vehicle is depressed. The control unit UC comprises computing means enabling it to compare the speed sensed for each wheel to the target speed, and it deduces the occurrence either of wheelspin or of a tendency of a wheel to lock by detecting that the speed sensed for a wheel is very different from the computed target speed (too high, too low or even zero).

The tendency to locking may be detected by variation of the speed difference compared to the target speed.

If the function selector 50 or 150 is in its antilock mode position 50B or 150B and a wheel tending to lock is detected, the control unit UC can, over a control line C110, C210, C310 and C410 for the FIG. 1 valves or a control line C510, C610, C710 and C810 for those of FIG. 2, operate the control valve associated with the brake cylinder of the wheel concerned to connect that cylinder to the return line and terminate the tendency to locking.

Similarly, if the selector 50 or 150 is in its antislip mode position 50A or 150A and wheelspin is detected, then the control unit UC can move the control valve associated with the brake cylinder of the wheel concerned to its antislip mode position (the single special mode position 110B, 210B, 310B or 410B in FIG. 1 or the antislip mode position 510C, 610C, 710 or 810C in FIG. 2).

In both cases, the valve is returned to its normal braking position when the speed sensed for the wheel that was slipping or tending to lock again conforms to the target speed.

The function selector 50 or 150 may be moved between its antilock mode position 50B or 150B and its antislip mode position 50A or 150A manually.

The control unit UC may be adapted to move the function selector between its antilock mode position and its antislip mode position as a function of the speeds of the wheels and their target speeds.

For example, the control unit UC can receive an instruction from the operator over an input line EO commanding it to move the function selector 50 or 150 between its positions. For this purpose, the unit UC is connected to the selector 50 or 150 by a control line C50 or C150.

The control unit UC advantageously moves the function selector 50 or 150 between its antilock mode position and its antislip mode position as a function of the sensed speeds of the wheels and their target speeds, provided that the target speeds remain below a particular threshold value, while the function selector may be moved from its antilock mode position to its antislip mode position only manually, when the target speeds exceed the threshold value, which is of the order of 15 to 20 kph.

Below this speed, the vehicle, which may be self-propelled construction site or agricultural plant, is often circulating under difficult conditions, for example over muddy terrain, in which case there is a high risk of wheelspin. It is therefore beneficial for the control unit to place the function selector automatically in its antislip mode position for such speeds, at which wheelspin occurs relatively frequently. For these speeds, the "default" mode is therefore the antislip mode.

For higher speeds, however, commands may cease to be received from the control unit over the line C50 or C150, the effect of which is to return the selector 50 or 150 to its antilock mode position. At high speeds like these, the operator may be called upon to effect sudden braking to avoid an obstacle, and it is under circumstances like these that the antilock mode is beneficial. Thus for these speeds the "default" mode is the antilock mode.

Even when the control unit places the selector in its antislip mode position, for example during operation at low speeds, control of braking by the operator, in particular by depressing the brake pedal 14, may also move the function selector automatically to its antilock mode position, so that the antilock function can be activated during braking, if necessary, simply by operating the control valve associated with the brake cylinder associated with the wheel having a tendency to lock.

For this reason, a braking sensor 15 (FIG. 1) or 15' (FIG. 2) may be connected to the control unit UC by a control line C15 or C15'.

In FIG. 1, the braking sensor is associated with the brake pedal 14. In FIG. 2 the braking sensor is a pressure switch for generating a signal if the pressure in the brake pipe reaches a threshold. A pressure sensor connected to the brake pipe may be used as a braking sensor.

The system of the invention can be used on vehicles with mechanical, hydromechanical or hydrostatic transmissions and equipped with a braking system assisted by an auxiliary pressure source.

One embodiment of the control valve 510 is described next with reference to FIGS. 4 to 6.

The channels 511A, 511B, 511C and 511D of this valve are respectively connected to a brake cylinder, a brake pressure source (via the pipe 44, as in FIG. 3), a pressure relief pipe (as in FIG. 3, in which this channel is connected to the reservoir 12), and an antislip pressure source (for example via the FIG. 3 pipe 153).

The valve 510 is a progressive valve and includes a member 520 in the form of a spool mobile in translation in a bore 522 in the body 524 of the valve.

The spool is mobile between three positions that correspond to the positions 510A, 510B and 510C described above with reference to FIGS. 2 and 3.

The valve 510 includes an actuator 530, which may be electromechanical, as in FIGS. 2 and 3, or of any other suitable type, for example a hydraulic actuator or a rotary electric motor.

The actuator moves the spool 520 in its first displacement direction F1 against a return force exerted by a spring 532. It is a proportional actuator, meaning that the force that it exerts on the spool 520 to move it in the direction F1 is proportional to its control input.

The actuator may be controlled by a control unit UC as described above, in particular to enable automatic activation and deactivation of the antislip and antilock modes by a command to move the spool to one of its positions as a function of an exterior set point managed by the control unit UC.

FIG. 4 shows the valve 510 in its normal braking position 510A, in which the braking pressure generated by the action on the driver on the brake pedal and fed to the second channel 511B via the brake pipe is transmitted to the first channel 511A and thus to the brake cylinder, because of the communication between the channels 511A and 511B via the groove 521A of the spool 520. This groove faces the orifice 522A in the bore 522, through which the bore communicates with the channel 511A, and the orifice 522B, through which the bore 522 communicates with the channel 511B. The orifices 522A and 522B are respectively called the "first brake cylinder connection orifice" and the "braking orifice". Braking is effected normally in this situation.

The conformation of the valve is such that the communication area between the first and fourth channels increases when the spool is moved away from its antislip mode position in the direction F1 and the communication area between the first and second channels decreases when it is moved away from its antilock mode position in the same direction F1.

FIG. 5 shows this valve in antilock regulation mode, in which it behaves as a pressure limiter for the pressure in the brake cylinder to which the first channel is connected.

In FIG. 5, the groove 521B of the spool 520 faces the orifice 522C (called the "pressure-relief orifice") through which the channel 511C communicates with the bore. Nonetheless, the upstream end (in the direction F1) of the groove 521B is at the edge of the orifice 522A' of the bore that is a second orifice connected to the brake cylinder. The groove 521A faces the orifice 522A and its upstream end in the direction F1 is at the edge of the orifice 522B.

The valve is therefore in an intermediate antilock mode position in which, if the spool 520 is moved in the direction F1, communication is established between the channels 511A and 511C, thus effecting pressure relief of the brake cylinder; if the spool is moved in the opposite direction F2, communication is established between the channels 511A and 511B, thereby effecting braking.

FIG. 6 shows this valve in an antislip regulation mode in which it behaves as a pressure reducer for the pressure in the brake cylinder.

In FIG. 6, the groove 521A faces the orifice 522A and its downstream end in the direction F1 is at the edge of the orifice 522B, and the groove 521B faces the orifice 522A' and its upstream end in the direction F1 is at the edge of the orifice 522C.

The valve is therefore in an intermediate antislip mode position in which, if the spool 520 is moved in the direction F1, communication is established between the channels 511A and 511D, thereby allowing the pressure to rise in the brake cylinder; if the spool is moved in the opposite direction F2, communication is established between the channels 511A and 511C, thus effecting pressure relief of the cylinder.

The valve 510 comprises a return control chamber 534 that is connected to the channel 511A in the antislip mode position. The pressure in the chamber 534 therefore depends on the pressure in the channel 511A (i.e. the brake cylinder pressure). Because this chamber has a mobile wall 534A delimited by a surface of the spool facing in the direction F1 (this wall is the upstream wall, in the direction F1, of a transverse bore 526 of the spool 520), a pressure rise in this chamber causes the spool 520 to be moved back in the direction opposite to its first direction of movement.

Consequently, if the pressure in the chamber 534 rises when the spool is in its antislip mode position, the communication area between the channels 511A and 511D is reduced, with the result that the head loss between the channel 511D and the channel 511A increases, to prevent excessive braking of the wheel that is slipping.

The orifices 522B, 522A, 522D, 522C and 522A' of the bore 522 are situated in succession in the direction F1.

The transverse bore 526 of the spool 520 communicates with the groove 521B to enable the chamber 534 to be fed with fluid from the channel 511A and to enable return flow from that chamber via the channel 511C.

On the side opposite this mobile wall, the chamber 534 is delimited by a fixed wall consisting of the end 536A of a needle 536 disposed in a longitudinal passage 527 of the spool and bearing on a plug 523 which shuts off the bore 522 and against which the spring 532 also bears.

The return forces in the direction F2 exerted on the spool by the spring 532 and by the forward pressure, acting on the end 536A of the needle 536 constituting a fixed wall of the chamber 534 facing its mobile wall 534A, therefore oppose the forces that the actuation head 531 of the actuator 530 exerts on the spool to move it in the direction F1.

The cross-section of the needle and the power of the actuator are selected so that these forces balance out after controlling either slipping of a wheel whose brake cylinder is connected to the channel 511A or locking of that wheel.

Thus the pressure in the channel 511A and therefore in the brake cylinder is regulated by the fact that the above-mentioned antagonistic forces are of the same order of magnitude.

The invention claimed is:

1. An antislip regulation and an antilock braking system for a vehicle equipped with a braking system comprising at least one brake cylinder associated with one or more wheels, a source of fluid under pressure, a brake control adapted to be operated to effect braking by feeding said cylinders with fluid under pressure via at least one brake valve and at least one brake pipe, a function selector adapted to adopt an antislip mode position in which said selector connects a branch pipe to a fluid feed pipe and an antilock mode position in which said selector connects a branch pipe to a return line, a control valve for each of said at least one brake cylinders adapted to adopt a normal braking position in which said control valve connects the cylinder to the brake pipe and at least one special mode position in which said control valve connects the cylinder to a branch pipe connected either to the return line or to the fluid feed pipe, according to the position of the function selector, and means, for detecting wheelspin or a wheel tending to rock and for controlling in consequence thereof at least the control valve for the brake cylinder associated with that wheel, the control valve for the each of said at least one brake cylinder being a progressive valve such that, when the function selector is in the antislip made position thereof, operation of the control valve modulates a braking force to control wheelspin and, when the function selector is in the antilock mode position thereof, operation of the control valve modulates the releasing of the braking of a wheel.

2. A system as claimed in claim 1, wherein the function selector comprises a feed channel connected to the fluid feed pipe, a return channel, a first outlet channel connected to a first branch pipe, and a second outlet channel connected to a second branch pipe, the control valve for each of said at least one brake cylinders being adapted to adopt two special mode positions, respectively an antilock mode position and an antislip mode position, and comprises a channel connected to the cylinder, a channel connected to the brake pipe, a channel connected to the first branch pipe, and a channel connected to the second branch pipe, and in that, in the antilock mode position of the selector, the return channel and the first outlet channel are connected together and the feed channel is isolated from them, in the antislip mode position of the selector, the feed channel and the second outlet channel are connected together and the return channel is isolated from them, and, in the normal braking position of the control valve, the channel connected to the cylinder and the channel connected to the brake pipe are connected together and the channels connected to the first and second branch pipes are isolated from them and from each other, in the antilock mode position of the control valve, the channel connected to the cylinder and the channel connected to the first branch pipe are connected together and the channel connected to the brake pipe and the channel connected to the second branch pipe are isolated from them, and, in the antislip mode position of said valve, the channel connected to the cylinder and the channel connected to the second branch pipe are connected together and the channel connected to the brake pipe and the channel connected to the first branch pipe are isolated from them and from each other.

3. A system as claimed in claim 2, wherein, in the antilock mode position of the function selector, the second outlet channel is connected to the return channel and, in the antislip mode position of the selector, the first outlet channel is connected to the return channel.

4. A system as claimed in claim 2, wherein the control valve for each of said at least one brake cylinders passes through the antilock mode position thereof on moving between the normal braking position and the antislip mode position thereof.

5. A system as claimed in claim 1, including includes an antislip fluid accumulator adapted to be supplied by the source of fluid under pressure and to be connected to said fluid feed pipe of the function selector.

6. A system as claimed in claim 5, wherein the fluid pressure in the fluid feed pipe of the function selector is lower than a pressure at which fluid is fed to the brake pipe and the antislip fluid accumulator is connected to the fluid feed pipe via a pressure reducer.

7. A system as claimed in claim 1, comprising a control unit adapted, if wheelspin or a wheel tending to lock is deduced, to move the control valves between the normal braking position thereof and the special mode position thereof as a function of the speeds of the wheels.

8. A system as claimed in claim 7, wherein the control unit is adapted to move the function selector between the antilock mode position thereof and the antislip mode position thereof as a function of the speeds of the wheels and target speeds thereof.

9. A system as claimed in claim 1, wherein the function selector is adapted to be moved between the antilock mode position and the antislip mode position manually.

10. A system as claimed in claim 9, wherein the control unit is adapted to move the function selector between the antilock mode position and the antislip mode position thereof as a function of speeds of the wheels and target speeds thereof for as long as said target speeds remain below a threshold value, whereas the function selector is adapted to be moved only manually from the antilock mode position to the antislip mode position if the target speeds exceed said threshold value.

11. A system as claimed in claim 1, wherein the function selector comprises a feed channel connected to the fluid feed pipe, a return channel, and an outlet channel connected to the branch pipe, the control valve for each of said at least one brake cylinders comprising a channel connected to the cylinder, a channel connected to the brake pipe, and a channel connected to the branch pipe, and wherein, in the antilock mode position of the selector, the return channel and the outlet channel are connected together and the feed channel is isolated from them, in the antislip mode position of the selector, the feed channel and the outlet channel are connected together and the return channel is isolated from them, in the normal braking position of the control valve, the channel connected to the cylinder and the channel connected to the brake pipe are connected together and the channel connected to the branch pipe is isolated from them, and, in the special mode position of the control valve, the channel connected to the cylinder and the channel connected to the branch pipe are connected together and the channel connected to the brake pipe is isolated from them.

12. A system, as claimed in claim 1, wherein the control valve for each brake cylinder includes double-acting pressure reducer means for adjusting the fluid pressure in the cylinder as a function of the operation of said valve.

13. A system as claimed in claim 1, wherein the antilock mode position of the function selector is an unoperated position of said selector towards which the latter is urged at all times, whereas said selector must be operated to move from said unoperated position to the antislip mode position.

14. A system as claimed in claim 1, wherein the normal braking position of the control valve for each of said at least one brake cylinders is an unoperated position of said valve towards which the latter is urged at all times, whereas said control valve must be operated to move it from said unoperated position to the at least one special mode position.

15. A system as claimed in claim 1, including at least one brake fluid accumulator adapted to be supplied by the source of fluid under pressure and at feast one brake valve adapted to be operated to connect the brake pipe to said accumulator.

16. A system as claimed in claim 1, wherein the fluid pressure in the fluid feed pipe of the function selector is lower than a pressure at which fluid is fed to the brake pipe.

17. A system as claimed in claim 1, comprising means for sensing a speed of each of said wheels, means for determining a target speed for each wheel, and means for comparing the sensed speed to said target speed and deducing therefrom the existence of wheelspin or of a wheel tending to lock.

18. An antislip and an antilock control valve for one or more wheels of a vehicle, having a first channel connected to a brake cylinder, a second channel connected to a braking pressure source, a third channel connected to a pressure relief pipe, and a fourth channel connected to an antislip pressure source, said control valve being a progressive valve that includes a movable member movable between a normal braking position in which the first and second channels are connected together and isolated from the third and fourth channels, an antilock mode position in which the first and third channels are connected together and isolated from the second and fourth channels, and an antislip mode position in which the first and fourth channels are connected together and isolated from the second and third channels, wherein said valve includes means for varying a communication area between the first and fourth channels in the antislip mode position as a function of the pressure in the first channel and for varying the communication area between the first and third channels in the antilock mode position as a function of the pressure In the first channel.

19. A valve as claimed in claim 18, including means for establishing communication between the first and third channels when communication between the first and fourth channels is shut off from the antislip mode position and for establishing communication between the first and second channels when communication between the first and third channels is shut off from the antilock mode position.

20. A valve as claimed in claim 18, includes including an actuator adapted to move the movable member in a first direction against a return force, wherein when the movable member is moved in said first direction from its antislip mode position the communication area between the first and fourth channels increases, and when said movable member is moved in said first direction from the antilock mode position thereof, the communication area between the first and third channels decreases, and wherein the value includes a return control chamber adapted to be connected in said antislip mode and antilock mode positions to the first channel of the valve so that the pressure in said chamber depends on the pressure in said first channel, the return control chamber having a mobile wall delimited by a surface of the movable member and facing in the first direction and a fixed wall facing the mobile wall, so said return control an increase in pressure in that chamber moves the movable member in the direction opposite the first direction.

21. A valve as claimed in claim 20, wherein there exists an intermediate antislip situation in which, when the movable member is moved in the first direction, communication is established between the first and fourth channels, whereas, when the movable member is moved in the opposite direction, communication is established between the first and third channels, and wherein there exists an intermediate antilock situation in which, when the movable member is moved in said first direction, communication is established between the first and third channels, whereas, when the movable member is moved in the opposite direction, communication is established between the first and second channels.

22. A valve as claimed in claim 20, wherein the movable member is mobile in translation in a bore comprising in succession in the first direction a braking orifice connected to the second channel, a first orifice connected to the brake cylinder connected to the first channel, an antislip orifice connected to the fourth channel, a pressure relief orifice connected to the third channel, and a second orifice connected to the brake cylinder connected to the first channel, wherein the movable has a first groove adapted to connect the first orifice connected to the brake cylinder either to the brake orifice or to the antislip orifice according to the position of the movable member, and a second groove adapted either to connect the pressure relief orifice to the second orifice connected to the brace cylinder or to isolate those two orifices from each other, according to the position of the movable member.

23. A valve as claimed in claim 22, wherein the second groove connects the return control chamber to the second orifice connected to the brake cylinder in the antislip mode and antilock mode positions.

24. A valve as claimed in claim 23, wherein the movable member has a transverse bore that communicates with said second groove and delimits said mobile wall of the return control chamber.

25. A valve as claimed in claim 24, wherein the return control chamber is delimited on the side opposite said movable wall by the end of a needle disposed in a longitudinal bore of the movable member connected to the transverse bore.

* * * * *